United States Patent
Yuan et al.

(10) Patent No.: US 10,193,841 B2
(45) Date of Patent: Jan. 29, 2019

(54) PRODUCT ONBOARDING VIA MESSAGES

(71) Applicant: Microsoft Technology Licensing, LLC, Redmond, WA (US)

(72) Inventors: Lawrence Yuan, Campbell, CA (US); Vidya Chandrasekaran, Mountain View, CA (US); Wynn Chen, San Francisco, CA (US); Stephen Philip Hiller, Santa Clara, CA (US); Benjamin Lai, Mountain View, CA (US); Bruno Pereira Medeiros, San Jose, CA (US); John Reilly, San Carlos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 237 days.

(21) Appl. No.: 14/811,717

(22) Filed: Jul. 28, 2015

(65) Prior Publication Data
US 2016/0036750 A1    Feb. 4, 2016

Related U.S. Application Data

(60) Provisional application No. 62/031,801, filed on Jul. 31, 2014.

(51) Int. Cl.
*G06F 15/16* (2006.01)
*H04L 12/58* (2006.01)

(52) U.S. Cl.
CPC .............. *H04L 51/14* (2013.01); *H04L 51/32* (2013.01)

(58) Field of Classification Search
CPC ................................ H04L 51/14; H04L 51/32
USPC .......................................................... 709/206
See application file for complete search history.

(56) References Cited

U.S. PATENT DOCUMENTS

| | | | |
|---|---|---|---|
| 2008/0154678 A1* | 6/2008 | Botelho | G06Q 30/02 705/14.69 |
| 2015/0317674 A1* | 11/2015 | Ghosh | G06Q 20/40 705/14.53 |
| 2015/0324849 A1* | 11/2015 | Datar | G06Q 30/0257 705/14.55 |

* cited by examiner

*Primary Examiner* — Wing F Chan
*Assistant Examiner* — Joseph Maniwang
(74) *Attorney, Agent, or Firm* — Schwegman Lundberg & Woessner, P.A.

(57) ABSTRACT

Techniques for onboarding users to various product features are described. According to various embodiments, information identifying a set of candidate onboarding content items associated with an email type of an email to be transmitted to a particular member of an online social network service is accessed. Thereafter, a first subset of the candidate onboarding content items is removed from the set, responsive to determining that the particular member has already been onboarded to products associated with the candidate onboarding content items in the first subset. Further, a second subset of the candidate onboarding content items is removed from the set, responsive to determining that the particular member has previously viewed and not interacted with the candidate onboarding content items in the second subset. A specific onboarding content item is then dynamically selected from the remaining set of candidate onboarding content items.

20 Claims, 10 Drawing Sheets

PRODUCT ONBOARDING VIA MESSAGES

CROSS-REFERENCE TO RELATED APPLICATIONS

This application claims the priority benefit of U.S. Provisional Application No. 62/031,801, filed Jul. 31, 2014, which is incorporated by reference herein in its entirety.

TECHNICAL FIELD

The present application relates generally to data processing systems and, in one specific example, to techniques for onboarding users to various product features or value propositions of an online social network service via messages.

BACKGROUND

Online social network services such as LinkedIn® feature a wide range of products that are offered to millions of members. Further, such online social network services typically send a very large number of emails to members, where such mails may include information describing news, updates, features, products, offers, etc., associated with the online social network service.

BRIEF DESCRIPTION OF THE DRAWINGS

Some embodiments are illustrated by way of example and not limitation in the figures of the accompanying drawings in which.

DETAILED DESCRIPTION

Example methods and systems for onboarding users to various product features or value propositions of an online social network service via messages are described. In the following description, for purposes of explanation, numerous specific details are set forth in order to provide a thorough understanding of example embodiments. It will be evident, however, to one skilled in the art that the embodiments of the present disclosure may be practiced without these specific details.

Figure 1:
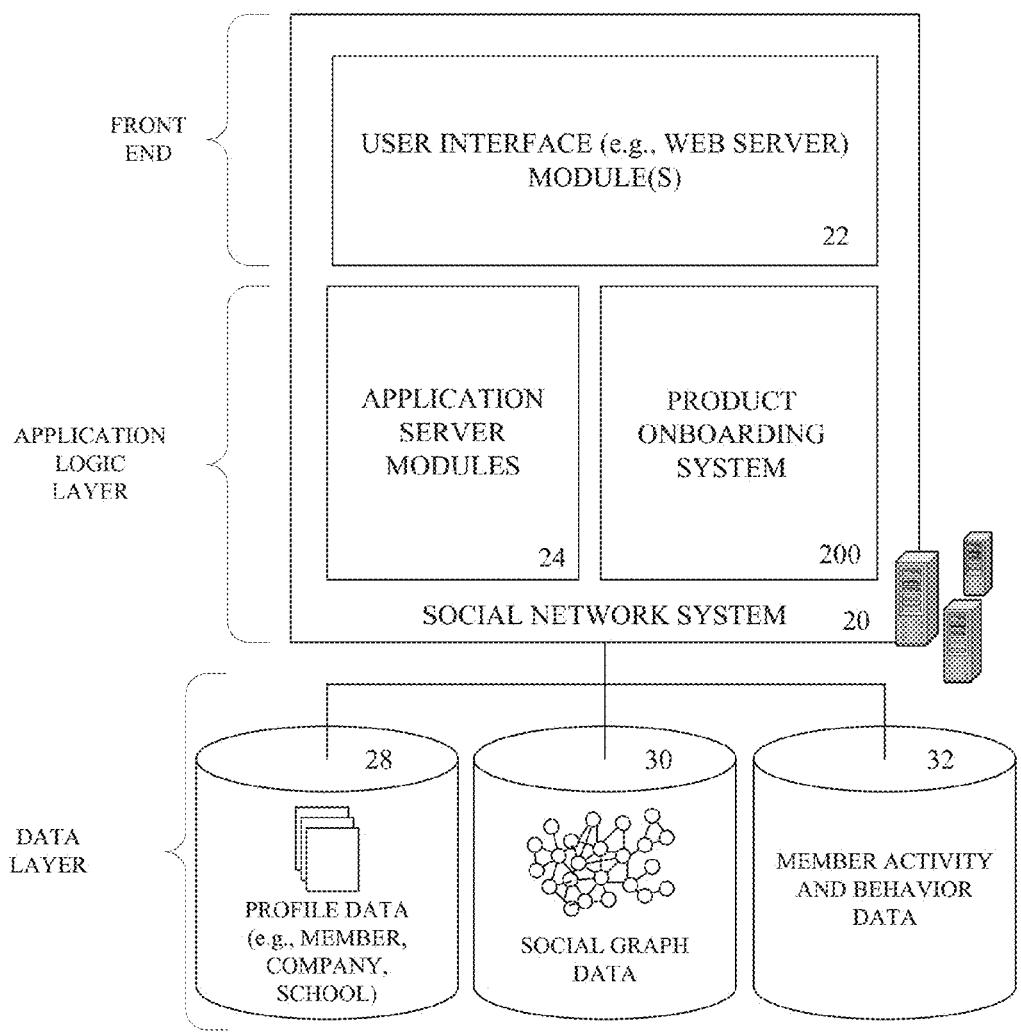
FIG. 1 is a block diagram showing the functional components of a social networking service, consistent with some embodiments of the present disclosure.

FIG. 1 is a block diagram illustrating various components or functional modules of a social network service such as the social network system 20, consistent with some embodiments. As shown in FIG. 1, the front end consists of a user interface module (e.g., a web server) 22, which receives requests from various client-computing devices, and communicates appropriate responses to the requesting client devices. For example, the user interface module(s) 22 may receive requests in the form of Hypertext Transport Protocol (HTTP) requests, or other web-based, application programming interface (API) requests. The application logic layer includes various application server modules 14, which, in conjunction with the user interface module(s) 22, generates various user interfaces (e.g., web pages) with data retrieved from various data sources in the data layer. With some embodiments, individual application server modules 24 are used to implement the functionality associated with various services and features of the social network service. For instance, the ability of an organization to establish a presence in the social graph of the social network service, including the ability to establish a customized web page on behalf of an organization, and to publish messages or status updates on behalf of an organization, may be services implemented in independent application server modules 24. As understood by those skilled in the art, a social graph is a database of all connections and associations between any two entities of an online social networking service, such as between two members, or between a member and an organization, etc. Similarly, a variety of other applications or services that are made available to members of the social network service will be embodied in their own application server modules 24. While FIG. 1 displays a front end that consists of a user interface module 22 implemented via, for example, a web server, the user interface module 22 may instead or in addition be implemented via email clients and/or an email server. For example, a user may utilize a locally installed mail client on their computing device to read email messages that are downloaded via a network (e.g., the interact) to their mail client via an email protocol such as Internet Message Access Protocol (IMAP) or Post Office Protocol (POP).

As shown in FIG. 1, the data layer includes several databases, such as a database 28 for storing profile data, including both member profile data as well as profile data for various organizations. Consistent with some embodiments, when a person initially registers to become a member of the social network service, the person will be prompted to provide some personal information, such as his or her name, age (e.g., birthdate), gender, interests, contact information, hometown, address, location or geography or locale, the names of the member's spouse and/or family members, educational background (e.g., schools, majors, matriculation and/or graduation dates, etc.), employment history, skills, professional organizations, and so on. This information is stored, for example, in the database with reference number 28. Similarly, when a representative of an organization initially registers the organization with the social network service, the representative may be prompted to provide certain information about the organization. This information may be stored, for example, in the database with reference number 28, or another database (not shown). With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social network service. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a uni-lateral operation, and at least with some embodiments, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, are stored and maintained within the social graph, shown in FIG. 1 with reference number 30.

The social network service may provide a broad range of other applications and services that allow members the opportunity to share and receive information, often customized to the interests of the member. For example, with some embodiments, the social network service may include a photo sharing application that allows members to upload and share photos with other members. With some embodiments, members may be able to self-organize into groups, or interest groups, organized around a subject matter or topic of interest. With some embodiments, the social network service may host various job listings providing details of job openings with various organizations.

As members interact with the various applications, services and content made available via the social network service, the members' behavior (e.g., content viewed, links or member-interest buttons selected, etc.) may be monitored and information concerning the member's activities and behavior may be stored, for example, as indicated in FIG. 1 by the database with reference number 32.

With some embodiments, the social network system 20 includes what is generally referred to herein as a product onboarding system 200. The product onboarding system 200 is described in more detail below in conjunction with FIG. 2.

Although not shown, with some embodiments, the social network system 20 provides an application programming interface (API) module via which third-party applications can access various services and data provided by the social network service. For example, using an API, a third-party application may provide a user interface and logic that enables an authorized representative of an organization to publish messages from a third-party application to a content hosting platform of the social network service that facilitates presentation of activity or content streams maintained and presented by the social network service. Such third-party applications may be browser-based applications, or may be operating system-specific. In particular, some third-party applications may reside and execute on one or more mobile devices (e.g., phone, or tablet computing devices) having a mobile operating system.

Figure 2:
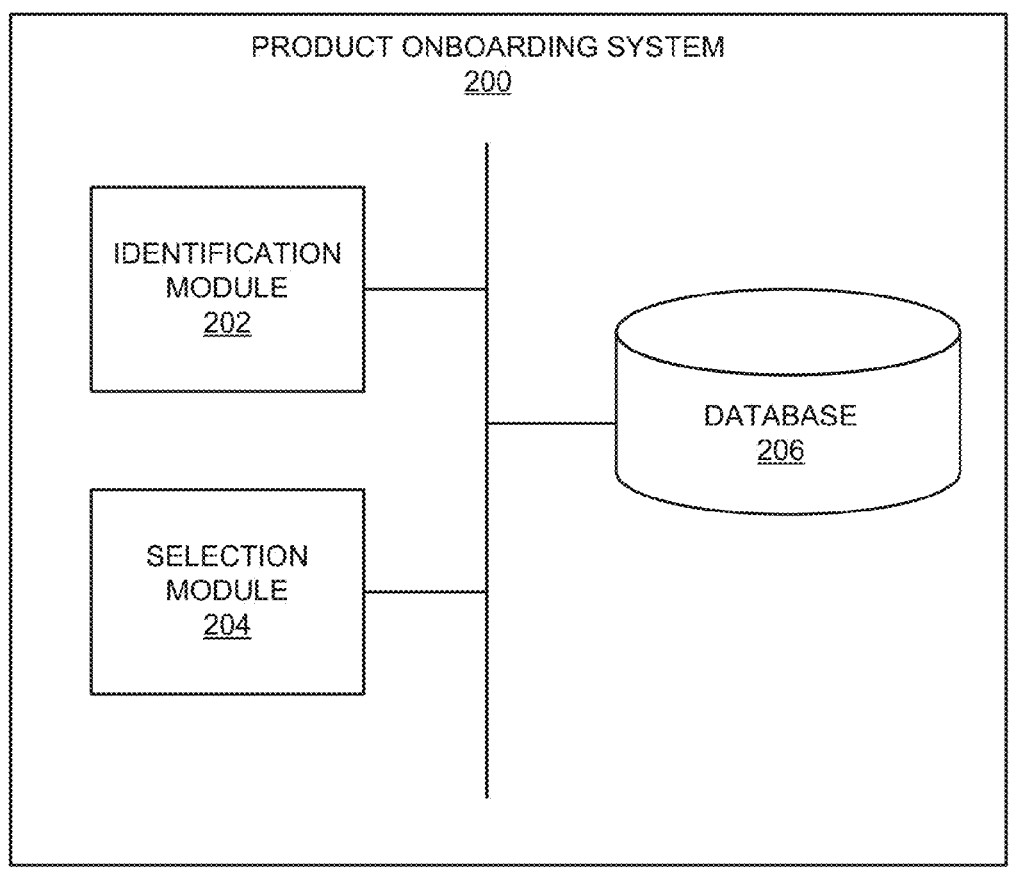
FIG. 2 is a block diagram of an example system, according to various embodiments.

Turning now to FIG. 2, a product onboarding system 200 includes an identification module 202, a selection module 204, and a database 206. The modules of the product onboarding system 200 may be implemented on or executed by a single device such as a product feature onboarding device, or on separate devices interconnected via a network. The aforementioned product feature onboarding device may be, for example, one or more client machines or application servers. The operation of each of the aforementioned modules of the product onboarding system 200 will now be described in greater detail below.

According to various example embodiments, a product onboarding system is configured to leverage various types of mails which an online social network service such as LinkedIn® sends to its members, in order to educate members about various product features and value propositions of the online social network service, and to help onboard such members to the aforementioned product features and value propositions of the online social network service.

Figure 3:
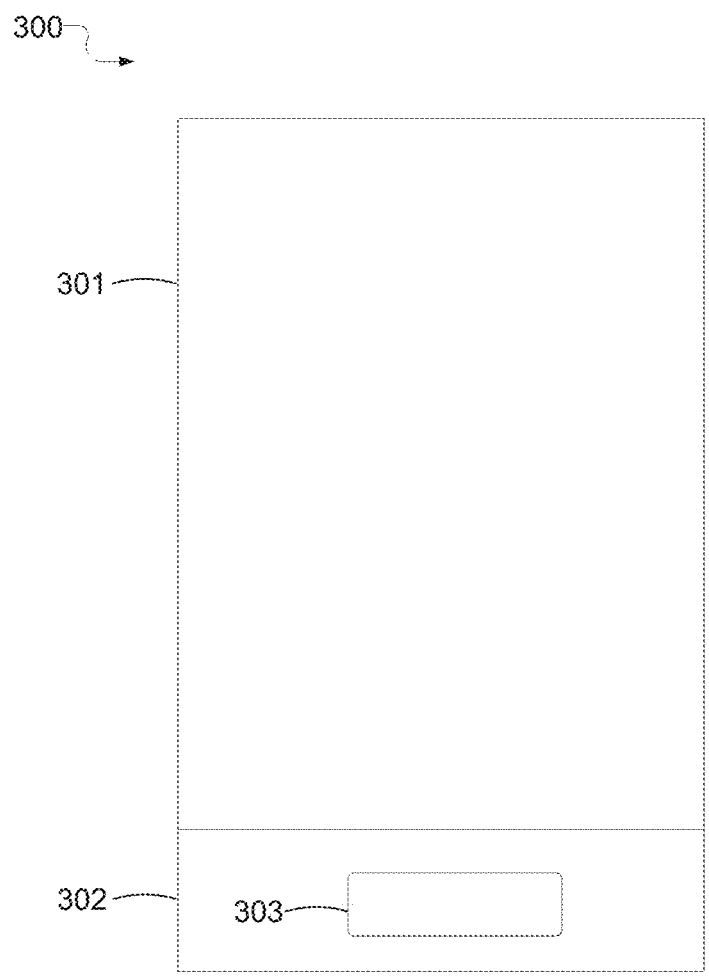
FIG. 3 illustrates an example portion of an email, according to various embodiments.
Figure 4:
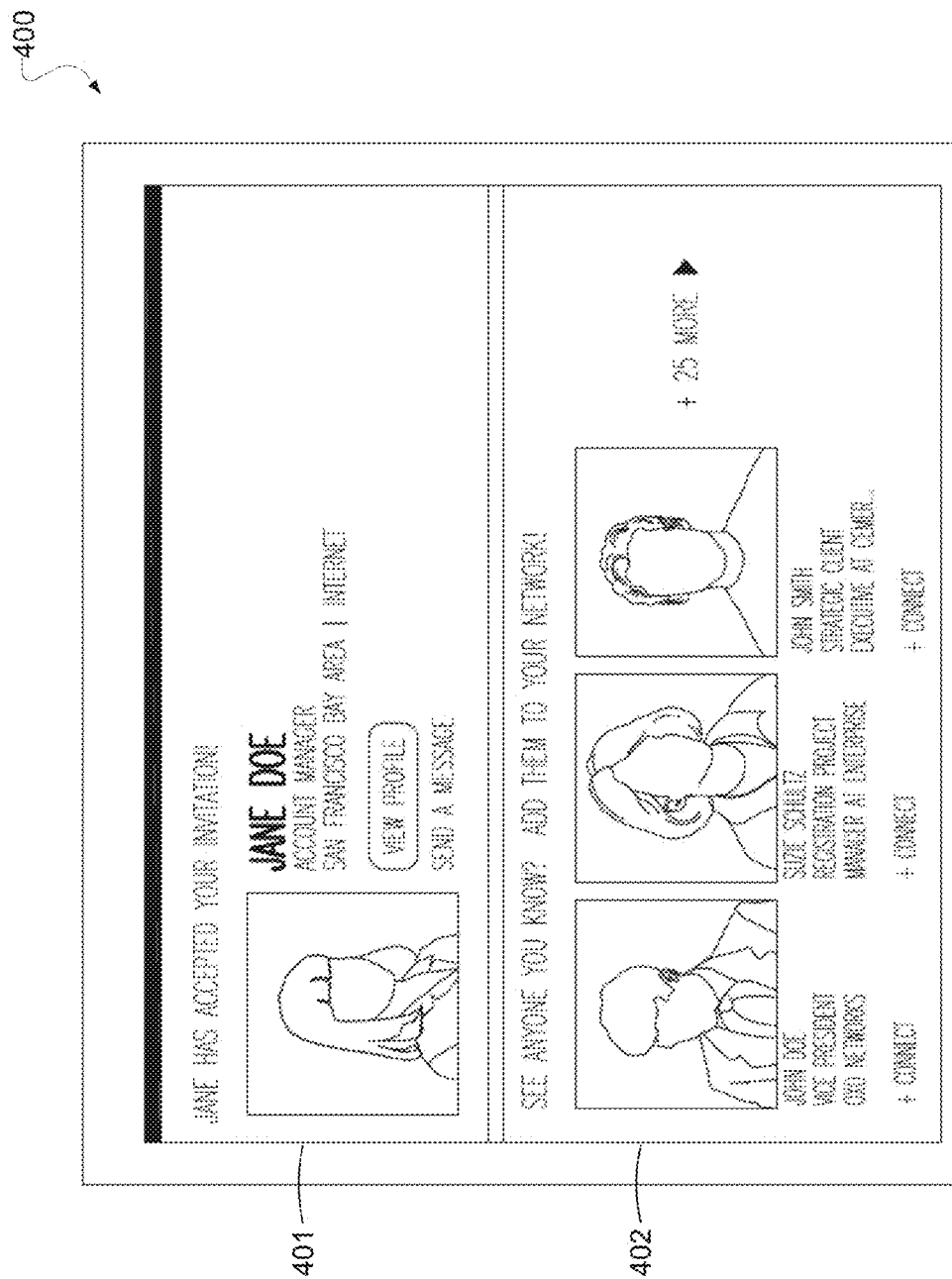
FIG. 4 illustrates an example portion of an email, according to various embodiments.

For example, as described in various embodiments herein, an email may be modified to include a specific portion of content (e.g., at the bottom of the email) that may be referred to herein as a "product/feature onboarding content item", "onboarding content item", "snack", or "snack content item" (or, alternatively, as an "upset", "promotion", "promotional", or "sample" content item) that displays information about a particular value proposition or product or service, such as a value proposition or product or service associated with an online social network service (e.g., a "people you may know" or a "network update stream" product on the LinkedIn® social network service, and so on). Thus, the product feature onboarding content may be similar to a promotion and may be configured to promote (or provide a user with a sample of) different types of products and services of the online social network service. Put another way, the purpose of onboarding content items is to onboard a user to a particular product feature by making them aware of that feature and possibly the benefits of using that feature. Onboarding may also include familiarizing the user with the functionality of that feature. For example, FIG. 3 illustrates an exemplary email 300, where the email 300 includes a main or body portion 301 with one or more pieces of content, as well as a lower portion 302 that includes an onboarding content item 303. As another example, FIG. 4 illustrates an exemplary invite-accept email 400, where the invite-accept email 400 includes a main or body portion 401 with one or more pieces of content (e.g., indicating that another member Jane Doe has accepted a connection invitation sent by the recipient of the email 400), as well as a lower portion that includes a people-you-may-know (PYMK) onboarding content item 402. While the onboarding content items depicted in FIGS. 3 and 4 are presented in the lower portion of an e-mail, such onboarding content items may be displayed anywhere in an email, including above other content items, to the side of other content items, or in between other content items (e.g., such that the other content items and the onboarding content items are displayed in a content feed format). Thus, such onboarding content items are similar to promotions, in that they may inform members about products and features, where the resulting increase in member awareness of such products and features may eventually lead to increased member engagement with such products and features. Onboarding content items may be included in any type of email, such as Network Update emails, Content Digest emails, Group Digest emails, and so on, in order to encourage users to become engaged with various products on LinkedIn® or another website or service. It is understood that an email may include multiple instances of product feature onboarding content anywhere in the email (and not necessarily at the bottom of the email).

Accordingly, the framework and techniques described in various embodiments herein may be utilized to find what onboarding content item makes more sense for each email and/or for each user. More specifically, the product onboarding system described herein may be utilized to determine the particular type and form of product feature onboarding content that is most appropriate to include in a particular email having other types of content, consistent with various embodiments described herein.

Accordingly, the product onboarding system described herein is configured to place the most appropriate onboarding content item in front of the most appropriate user at the most appropriate time to help hem get the most out of an online social network service such as LinkedIn®. This may be particularly beneficial as a large proportion of online social network service users (e.g., LinkedIn® users are not onboarded to various product features and value propositions of the online social network service (e.g., Network-related, Career-related, Profile-related, or Content-related product features of the LinkedIn® online social network service). In the case of LinkedIn®, for example, many of these users do not visit the site regularly, making it difficult for the online social network service to onboard them/educate them on site product features. Accordingly, email represents a huge opportunity. For example, the LinkedIn® online social network service sends 1 billion emails reaching more than 180 million users every week, these emails already drive a large portion of all traffic to the LinkedIn® site, and email accounts for a large portion of a user experiences on LinkedIn®. The onboarding techniques described herein can insert relevant onboarding content items in existing emails, and can also insert relevant onboarding content items in stand-alone emails (e.g., emails that include only one or more onboarding content items with no traditional body). In the example online social network service of LinkedIn®, the product onboarding system described herein may lead to increases in various user interactions with the site, such as increases in invitations sent, content follow actions, job views, profile edits, and so on.

The embodiments described herein are applicable not only to emails but to any type of electronic message, including an email, text message (e.g., a short messaging service (SMS) message, a multimedia messaging service (MMS) message, etc.), an instant message associated with an online social network (e.g., Facebook®, LinkedIn®, Wechat®, WhatsApp®, etc.), a chat message associated with an online chat service, and so on.

Non-limiting examples of types of mails include a Network Connection update email (e.g., summarizing compelling changes in the member's social network, such as job changes, anniversaries, new members in network, etc.), a News Update email, a Content Feed or Network Update Stream (NUS) Digest email indicating posts, articles, news items, publications, etc., associated with a content feed of an online social network service, a Jobs Update email (e.g., a Jobs-You-May-Be-Interested-In (JYMBII) email describing the jobs that may be of interest to the current member), an Influencer Post Update email, a Company Update email, a People-You-May-Know (PYMK) email, a Who-Has-Viewed-Your-Profile (WVYP) email (also referred to herein as a Personal Identity Digest (PID) email), an Invite-Accept email indicating that another member has accepted a connection invitation of the current member, a Member-to-Member (M2M) Invitation email indicating that another member has invited the current member to connect with the other member, an M2M Invitation Reminder email reminding the current member of a pending member-to-member invitation, a Group Update email (e.g., summarizing information from group entities that the current member is associated with), a Member-to-Group Invite email from a member to a group administrator requesting to join a group, a Member-to-Group reminder email reminding a group administrator of a member-to-group invitation, an Educational institution (e.g., school or university) Update email, a Recommendation email, a Recruiters-You-May-Want-To-Contact email, a Content Ecosystem Digest (CED) email including news articles, and so on. The embodiments described herein are also applicable to other types of emails known by those skilled in the art, such as mails transmitted by an online social network service. The email content data may also specify other information about the email, such as whether other onboarding content items are going to be included in the email to be sent to the member.

According to various example embodiments, the product onboarding system 200 may identify an onboarding content item to present to a particular member in the following manner. First, the product onboarding system 200 may determine an email type of an email to be transmitted to the particular member. For example, the product onboarding system 200 may determine that John Smith's invitation to connect to another member was accepted, and therefore he is due to receive an Invite-Accept email indicating that another member has accepted a connection invitation of John Smith. The product onboarding system 200 may then identify a set of candidate onboarding content items associated with this "Invite-Accept" email type. Put another way, the product onboarding system 200 determines all available onboarding content items that can be shown to John Smith (e.g., a Pending Invites onboarding content item, a PYMK onboarding content item, an Address Book Upload onboarding content item, a Pending Endorsements onboarding content item, a JYMBII Suggestions onboarding content item, an Influencer Suggestions onboarding content item, etc.). Thereafter, the product onboarding system 200 may determine if there are any onboarding content items that should be eliminated from consideration. For example, the product onboarding system 200 may determine that the Address Book Upload onboarding content item should be eliminated since John already performed an Address Book Upload in the last 30 days (and thus, John is essentially already onboarded to this Address Book Upload product). As another example, the product onboarding system 200 may determine that the JYMBII onboarding content item should be eliminated since John hasn't responded the last 5 times it was shown (e.g., displaying it may violate an impression capping rule). Thereafter, the product onboarding system 200 may determine the onboarding content item to show John Smith from the remaining set of onboarding content items. For example, the product onboarding system 200 may utilize a random selection scheme (e.g., randomly show 1 of the remaining onboarding content items, or randomly choose 1 of the remaining onboarding content items and remove it from the choices next time until all items have been chosen at random) or a fixed rotation selection scheme (e.g., rotate through the onboarding content items based on a fixed order of the onboarding content items). As another example, the product onboarding system 200 may utilize business rules based weights based on member profile attributes of John or what member segment John falls into (e.g., the product onboarding system 200 may assign weights to onboarding content items based on John's level of connectivity, such that if John has <30 connections, he gets PYMK/Pending Invites 80% of the time). As another example, the product onboarding system 200 may utilize propensity based weights. For example, the product onboarding system 200 may determine John's propensity to click on each onboarding content item via Machine Learning, receive a user specification of the business value of each onboarding content item when acted on, calculate composite weight for each onboarding content item based on the propensity and business value, and then prioritize rotation of onboarding content item based on composite score. The product onboarding system 200 may then insert the selected onboarding content item into the email, and transmit the email to the member John Smith.

The product onboarding system 200 described herein is configured to communicate with both online and offline systems to create both dynamic and static snacks. As described in more detail below, dynamic snacks may include data specific to a user (e.g., Pending Invites) whereas static snacks need not have user specific data (e.g. a Generic Address Book snack). In some embodiments, the snacks may be reusable for different types of emails (e.g. once built for one email the snack may be implemented across other types of emails).

Examples of dynamic snacks include snacks related to various network-related products of the LinkedIn® online social network service, such as a People You May Know (PYMK) Recommendation snack identifying other members that the current viewing member may know, a Pending Invitation snack for the user indicating other members that have previously sent an invitation to connect to the current member, an Address Book Social Proof Data snack (e.g., encouraging the member to upload their address book for sending invitations to their contacts in their address book, by including pictures of a user's connections that have uploaded their own address books), a Gamification snack (e.g., displaying or awarding "badges" or "accomplishments" to the current member based on their number of connections), and an Event snack identifying upcoming events. Examples of dynamic snacks also include snacks related to various content-related products of the LinkedIn® online social network service, such as an Influencer snack that includes recommendations specific to the user (e.g., articles posted by Influencers), a Groups You May Like (GYML) snack including recommendations that are specific for the user, a Channel snack including recommendations (e.g., network update stream versus mobile) that are specific for the user, and a Jobs You May Be Interested In (JYMBII) snack including recommendations that are specific to user. Examples of dynamic snacks also include snacks related to various Profile-related products of the LinkedIn® online social network service, such as a user specific profile completeness score snack with a prompt to edit their profile, a Social Proof Promotion snack to encourage the user to make their profile more complete (e.g., "Join X, Y, and Z with more complete profiles/photos"), an Add Second Position snack encouraging the user to add additional positions to their member profile, an Add Photo snack encouraging the user to add their photo (possibly leveraging social proof by identifying other users that have added photos to their profile), a Pending Endorsements snack identifying the viewing member's pending endorsements, and a Smart Guided Editing snack providing the member with personalized suggestions for completing their profile. Examples of dynamic snacks also include snacks related to various invitation-related products of the LinkedIn® online social network service, such as a Connections In Common snack that displays other members with common connections to the email recipient, and that encourages the recipient to connect with these other members, and a Companies/Schools In Common snack that displays the common schools and companies between two members to inform the current member (recipient) how they and the other member are related. The product onboarding system 200 may generate versions of some of the aforementioned dynamic snacks based on the connections of the viewing user, or based on the connections of a new connection of the viewing user e.g., after Invite Accept by the viewing user).

Examples of static snacks include snacks related to various network-related products of the LinkedIn® online social network service, such as Generic/Standard Address Book snack (encouraging the member to upload their address book for sending invitations to their contacts in their address book, with icons for the mail providers), and a Generic PYMK snack (taking the user to PYMK page on site). Examples of static snacks also include snacks related to various content-related products of the LinkedIn® online social network service, such as Generic Influencers snack (taking the user to the Influencer page on site), a Generic Channels snack (taking the user to the channel page on site), and a Generic Groups snack (taking the user to the GYML page). Examples of static snacks also include snacks related to various Profile-related products of the LinkedIn® online social network service, such as a Generic Profile Completeness snack (taking to guided editing on site). Examples of static snacks also include snacks related to various Mobile-related products of the LinkedIn® online social network service (such as a Download Mobile App snack), or various Career-related products of the LinkedIn® online social network service (such as Upsell of Jobseeker Subscription, Recruiter Subscription, or some other subscription), and other products (such as "Did you know" type generic promotions for the purposes of encouraging profile completeness (e.g. "Did you know adding a photo makes you X times more likely to be viewed?"). Another example of a snack includes a Connected snack that introduces new LinkedIn® applications such as the LinkedIn® Connected mobile application to LinkedIn® members.

In some embodiments, the product onboarding system 200 includes sorting and filtering capabilities for backend-data (e.g., data pertaining to users) for the purposes of populating snacks. For example, in some embodiments, the product onboarding system 200 may filter out dynamic snacks (for example, a dynamic PYMK snack) that require the product onboarding system 200 to retrieve and prioritize certain backend results with photos (for example, the member profile photos of other members to be included in a dynamic PYMK snack), if not enough backend results with photos are available. Based on the count of results with photos (e.g. by comparing the count with a predetermined threshold number), the product onboarding system 200 may determine what variant of the snack to show (e.g., dynamic variant vs static variant). For example, if there are a sufficient number of results with photos (e.g., member profile photos of relevant member connections of the email recipient), the product onboarding system 200 may display the dynamic variant of a PYMK snack, otherwise the product onboarding system 200 may display the static variant of a PYMK snack. As another example, if the email recipient has enough data (e.g., member profile photos of relevant member connections of the email recipient) for the Social Proof Address Book Upload snack described above, then the product onboarding system 200 may display the social/dynamic variant, otherwise the product onboarding system 200 may revert to the static variant of the address book snack. Thus, the product onboarding system 200 may seamlessly switch between variants of snacks.

In some embodiments, different types of snacks may be associated with different types of emails, since not all snacks are suitable for all emails. For example, for a Professional Identity Digest (PID) email, the product onboarding system 200 may associate the Dynamic PYMK snack, Dynamic Pending Invites snack, Static Address Book snack, and Dynamic Social Address Book snack therewith. As another example, for a content feed or Network Update Stream (NUS) Digest email, the product onboarding system 200 may associate the Dynamic Pending invites snack, Static Address Book snack, Dynamic Gamification snack (e.g., displaying or awarding "badges" or "accomplishments" to the current member based on their number of connections), and Static Influencers Promotion snack therewith. As another example, for an Invite Accept email, the product onboarding system 200 may associate the Static "Get LinkedIn® Mobile App" snack, the Static Influencers Promotion snack, the Dynamic Social Proof Add Photo snack, or the Dynamic Influencers Promotion snack (with specific recommendations) therewith.

In some embodiments, the product onboarding system 200 may store lookup tables of candidate information identifying various types of snacks that are associated with (or are eligible for/compatible with) various types of emails. Accordingly, when the product onboarding system 200 determines that a particular email is to be transmitted to a member of the online social network service, the product onboarding system 200 may identify the type of the email, and access the lookup table of candidate information to identify a set of eligible snacks. The product onboarding system 200 may then select the snack for inclusion in the email from the set of eligible snacks. In some embodiments, the product onboarding system 200 may display a user interface enabling an operator of the product onboarding system 200 to specify the aforementioned candidate information.

In some embodiments, the product onboarding system 200 may utilize user qualifying criteria or business rules to determine if a user sees a particular snack. Such rules may be stored in a database (e.g., database 206 in FIG. 2) and may be checked at the time of determining snacks that a user is eligible to see. Alternatively, if a specific snack is already selected to be displayed to the user, the product onboarding system 200 may check that these rules are satisfied by the selected snack. For example, for the Address book Snack, the associated user qualifying criteria may state that this snack should not be displayed if the user did an Address book import in the last 30 days. As another example, for the Jobseeker upsell snack, the associated user qualifying criteria may state that this snack should not be displayed to users that are already premium Jobseeker account subscribers. As another example, for the General subscription upset snack, the associated user qualifying criteria may state that this snack should not be displayed to users that are already general subscribers. As another example, for the Profile photo update snack, the associated user qualifying criteria may state that the snack should not be displayed if a user has a profile photo. As another example, for the General profile completeness snack, the associated user qualifying criteria may state that this snack should not be displayed if the user's profile strength is "expert", "all star", etc. As another example, for the Groups snack, the associated user qualifying criteria may state that this snack should not be displayed if the user is already in 20+ groups. As another example, for the Influencer snack, the associated user qualifying criteria may state that the snack should not be displayed if the user is already following 5+ influencers. As another example, for the Channels snack, the associated user qualifying criteria may state that this snack should not be displayed if the user is already following 5+ channels.

In some embodiments, the product onboarding system 200 may utilize impression capping/cool off period rules to determine if a user is qualified to see a particular snack. Such rules may be stored in a database (e.g., database 208 in FIG. 8) and may be checked at the time of determining snacks that a user is eligible to see. Alternatively, if a specific snack is already selected to be displayed to the user, the product onboarding system 200 may check that these rules are satisfied by the selected snack. As an example of an impression capping rule, if a user has been exposed to a snack "X" times (where X is a configurable number by snack), such as during a given time interval, and the user has still not taken any action, the product onboarding system 200 may retire the snack from that user (e.g., for Y days). Another example of an impression capping rule is a rule indicating that the system 200 may show a given snack no more than X times per Y days (e.g., no more than 2 times in 14 days). The aforementioned X and Y values can be configured and optimized for different snacks (e.g. the Address book snack may be displayed up to 5 times before the product onboarding system 200 determines not to show it again, whereas the PYMK snack may be displayed up to 10 times). In some embodiments, the system 200 may display a user interface enabling an operator of the system 200 to manually configure the aforementioned X and Y values. In other embodiments, the system 200 may tune the impression capping via machine learning algorithms. For example, the 200 may learn over time how a particular user tends to behave or interact with onboarding content items, and may tune the impression capping rules for the user appropriately. For instance, a power user or frequent user may be more likely to be annoyed faster (and thus less receptive to repeat impressions of a snack) than a dormant or new user, and hence the system 200 may ensure that an identified power or frequent user may have a more aggressive impression capping rule (i.e. with lower impression caps) than a dormant or new user. In some embodiments, if the system 200 determines that the user has historically taken action on a snack after being exposed to the snack up to X times (and/or the user has not taken any action on a snack after being exposed to the snack more than X times), then the impression cap may be automatically tuned to X, and may be periodically automatically retuned based on any changes in the user's behavior.

In some embodiments, the system 200 may also implement frequency setting instead of, or in addition to, impression capping. For example, a frequency setting rule may specify that the system 200 may only display a given snack to a particular user at a periodic interval (e.g., every, Tuesday, every 14 days, etc.). Frequency setting data storing such frequency settings rules may be stored in a database (e.g., database 206 in FIG. 2) and accessed by the identification module 202. The system 200 may display a user interface enabling an operator of the system 200 to configure such frequency settings rules for each onboarding content item and/or user.

In some embodiments, after the product onboarding system 200 identifies qualifying snacks (e.g., based on the type of email being transmitted, and based on the user qualifying criteria/business rules described above, and based on the impression capping rules described above, etc.), then the product onboarding system 200 may select specific snack based on various techniques. For example, in some embodiments, the product onboarding system 200 may employ what is referred to herein as a "random selection scheme". For example, for a given email, the product onboarding system 200 may randomly select one of the available snacks. The aforementioned available snacks may correspond to the snacks that are available for the user and the email (e.g., the Invite accept email may be associated with 6 possible snacks but if only 3 snacks are available for the user, then the random selection would occur from the 3 snacks that are available for the user).

In some embodiments, the product onboarding system 200 may track the last snack the user saw and execute the random selection in a modified fashion that ensures diversity for the user. For example, the product onboarding system 200 may randomly choose 1 of the available snacks and then remove it from the choices next time until all snacks have been chosen at random. Alternatively, the product onboarding system 200 may assign a lower weight to the last snack displayed to the user, before selecting from the available snacks randomly. Thus, an onboarding content item may be selected from a set of candidate onboarding content items based on a weighted rotation selection scheme, such that each of the onboarding content items are chosen randomly from the set with a probability that is determined by a weight that is assigned to each onboarding content item in the set, where a most recently viewed candidate onboarding content item in the set is assigned a lower weight relative to other candidate onboarding content items in the set. In some embodiments, the product onboarding system 200 may utilize a fixed rotation selection scheme (rotate through all available snacks in a fixed "round robin" order).

In some embodiments, the product onboarding system 200 may employ what is referred to herein as a "Weighted Rotation of Snack" technique. In this scenario, the user (e.g., employee or administrative the online social network service) may be presented with the user interface to specify business rules that determine weights and order for different member segments of the online social network service. For example, if the recipient has <30 connections, he gets PYMK/Pending Invites 80% of the time. Thus, an onboarding content item may be selected from a set of candidate onboarding content items based on a weighted rotation selection scheme, such that each of the onboarding content items are chosen randomly from the set with a probability that is determined by a business rule weight that is assigned to each onboarding content item in the set.

In some embodiments, the product onboarding system 200 may employ what is referred to herein as a "Propensity model" technique. In this example, instead of the weights being determined by the user (e.g., employee or administrative the online social network service), the weights may be determined through propensity model scores via machine learning, as described in more detail below. For example, the selection module 204 may perform prediction modeling to determine which snack a particular user is most likely to interact with.

Figure 5:
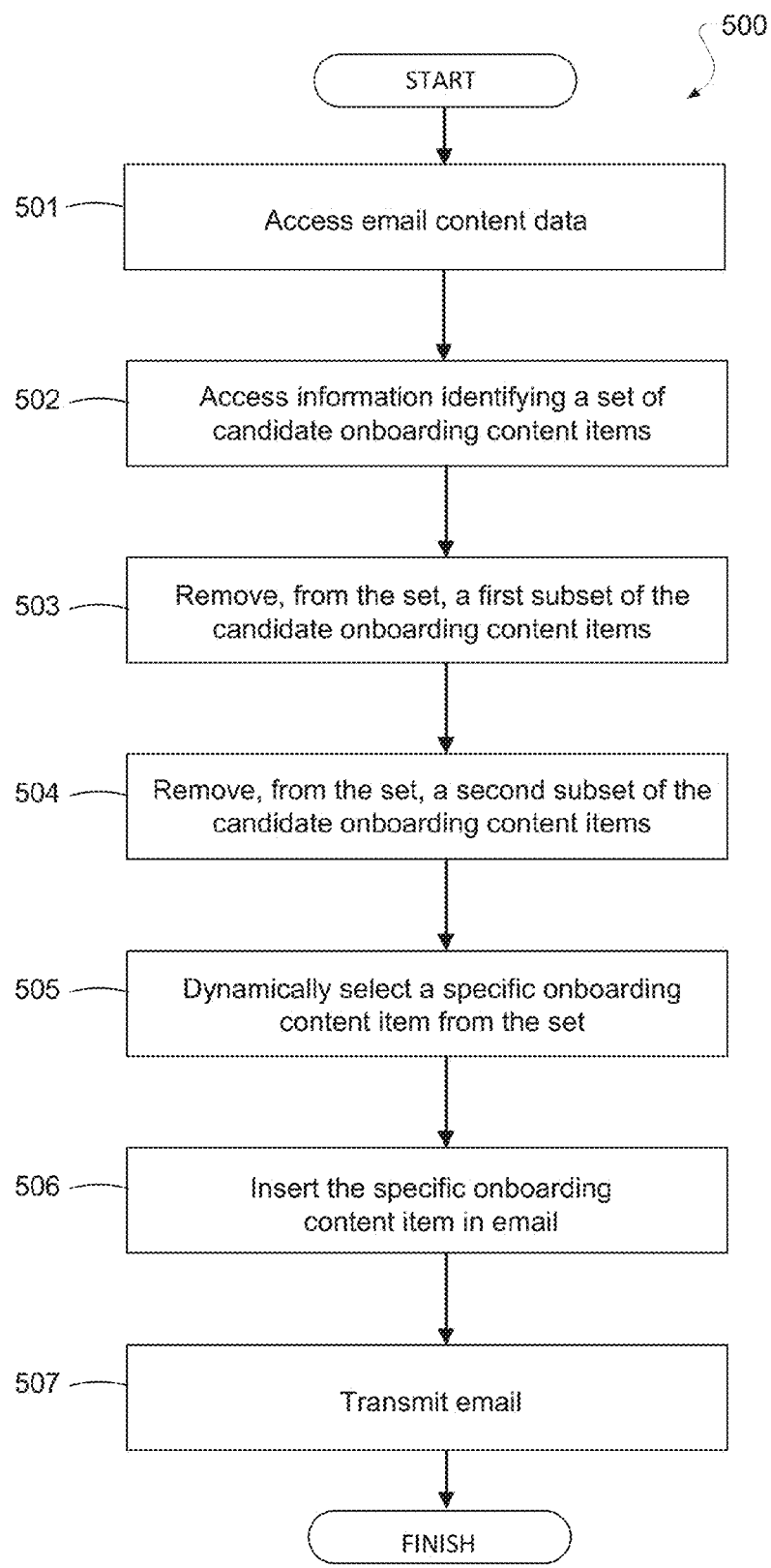
FIG. 5 is a flowchart illustrating an example method, according to various embodiments.

FIG. 5 is a flowchart illustrating an example method 500, consistent with various embodiments described herein. The method 500 may be performed at least in part by, for example, the product onboarding system 200 illustrated in FIG. 2 (or an apparatus having similar modules, such as one or more client machines or application servers). In operation 501, the identification module 202 accesses, via one or more data sources, email content data describing an email type of an email to be transmitted to a particular member of an online social network service. In operation 502, the identification module 202 accesses, via the one or more data sources, candidate information identifying a set of candidate onboarding content items associated with the email type described in the email content data (which was accessed in operation 501). Each of the onboarding content items in the set is configured to promote a particular product feature associated with the online social network service. Thus, each onboarding content item may be associated with a corresponding distinct product feature. In some embodiments, the candidate information identifies a plurality of email types and one or more candidate onboarding content items associated with each of the email types.

In operation 503, the identification module 202 removes, from the set identified in operation 502, a first subset of the candidate onboarding content items, responsive to determining that the particular member has already been onboarded to products associated with the candidate onboarding content items in the first subset. In operation 504, the identification module 202 removes, from the set that was reduced in operation 503, a second subset of the candidate onboarding content items, responsive to determining that the particular has previously viewed and not interacted with the candidate onboarding content items in the second subset. In operation 505, the selection module 204 dynamically selects a specific onboarding content item from the remaining set of candidate onboarding content items (e.g., after the reductions to the set in operation 503 and in operation 504). In some embodiments, the selection module 202 may select more than one onboarding content item from the remaining set of candidate onboarding content items (e.g., the top X onboarding content items, or a predetermined number X of onboarding content items associated with the highest relevance scores, as described in more detail below). In operation 506, the selection module 204 inserts the specific onboarding content item that was selected in operation 505 in the email to be transmitted to the particular member. In some embodiments, if more than one onboarding content item was selected in operation 505, then these multiple onboarding content items may be inserted into the email to be transmitted to the particular member in operation 506. In operation 507, the selection module 204 transmits the email (including the specific onboarding content item that was inserted into the email in operation 506) to the particular member. In some embodiments, the selection module 204 of the product onboarding system 200 may be associated with (or may correspond to or include) a mail server or mail application (e.g., Google® Gmail, Yahoo® mail, etc.) configured to transmit emails to members via various known email protocols (e.g., Simple Mail Transfer Protocol (SMTP)). It is contemplated that the operations of method 500 may incorporate any of the other features disclosed herein. Various operations in the method 500 may be omitted or rearranged, as necessary.

Figure 6:
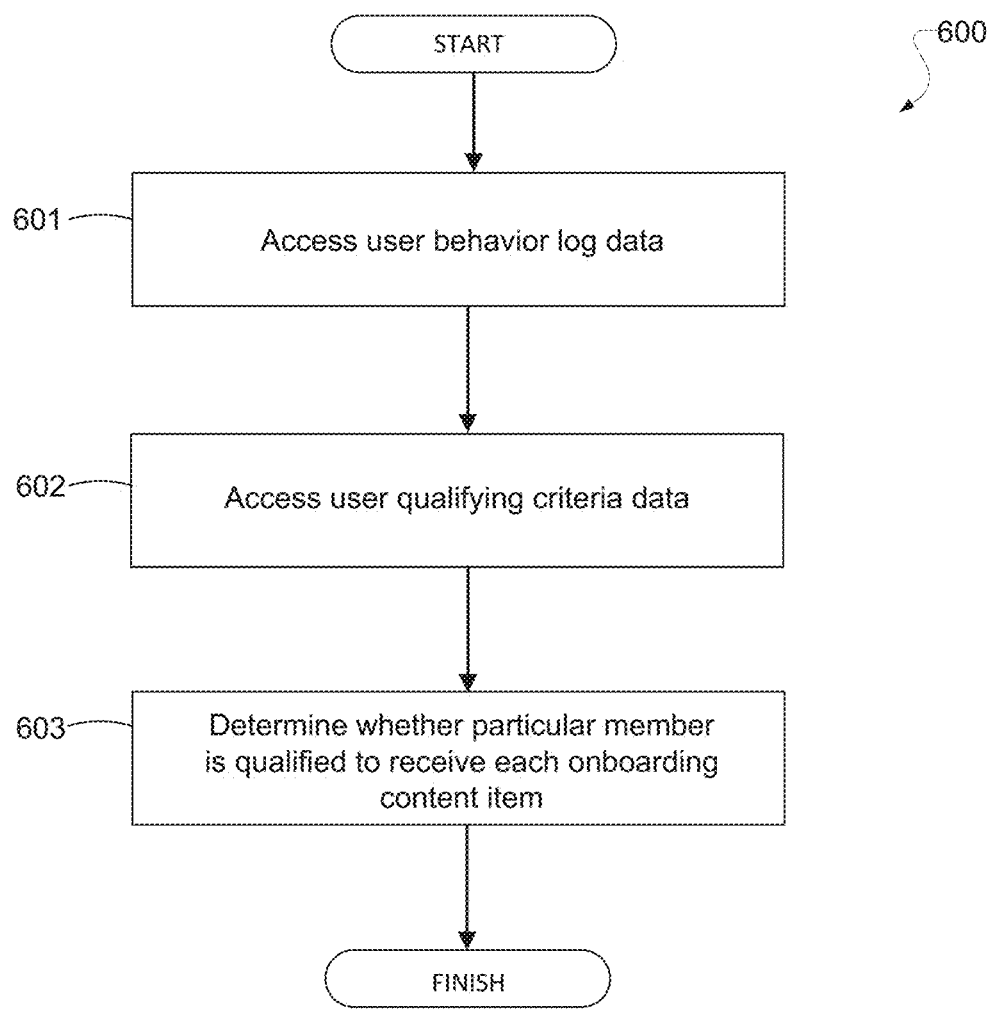
FIG. 6 is a flowchart illustrating an example method, according to various embodiments.

FIG. 6 is a flowchart illustrating an example method 600 for determining that a particular member is not qualified to receive a first subset of candidate onboarding content items in a set of candidate onboarding content items (e.g., see operation 503 in FIG. 5), consistent with various embodiments described herein. The method 600 may be performed at least in part by, for example, the product onboarding system 200 illustrated in FIG. 2 (or an apparatus having similar modules, such as one or more client machines or application servers). In operation 601, the identification module 202 accesses user behavior log data associated with the particular member. In operation 602, the identification module 202 accesses user qualifying criteria data associated with each onboarding content item in the set. In some embodiments, the user qualifying criteria data for a given onboarding content item indicates that a user is not qualified to receive the given onboarding content item based on prior user interaction with a product associated with the given onboarding content item. The prior user interaction may correspond to performing a predetermined user action in connection with the product during a predetermined time period. In some embodiments, the product onboarding system 200 may display a user interface enabling an operator of the product onboarding system 200 to specify the aforementioned user qualifying criteria data. In operation 603, the identification module 202 determines, for each onboarding content item in the set, based on the user behavior log data accessed in operation 601 and the user qualifying criteria data accessed in operation 602, whether the particular member is qualified to receive the corresponding onboarding content item. Accordingly, the product onboarding system 200 may determine a first subset of candidate onboarding content items in a set of candidate onboarding content items that a particular member is not qualified to receive. It is contemplated that the operations of method 600 may incorporate any of the other features disclosed herein. Various operations in the method 600 may be omitted or rearranged, as necessary.

Figure 7:
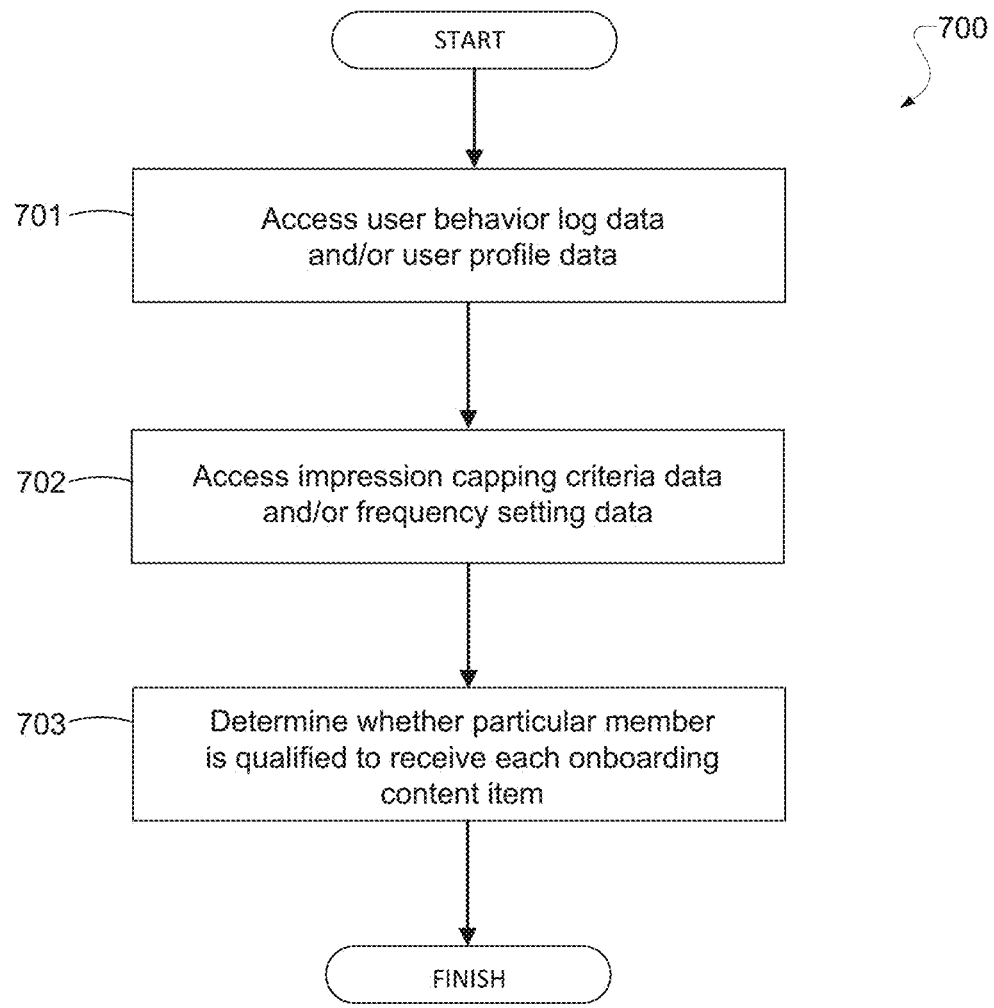
FIG. 7 is a flowchart illustrating an example method, according to various embodiments.

FIG. 7 is a flowchart illustrating an example method 700 for determining that a particular member has previously viewed and not interacted with a subset of candidate onboarding content items in a set of candidate onboarding content items (e.g., see operation 504 in FIG. 5), consistent with various embodiments described herein. The method 700 may be performed at least in part by, for example, the product onboarding system 200 illustrated in FIG. 2 (or an apparatus having similar modules, such as one or more client machines or application servers). In operation 701, the identification module 202 accesses user behavior log data and/or user profile data associated with the particular member. In operation 702, the identification module 202 accesses impression capping criteria data and/or frequency setting data associated with each onboarding content item in the set. In some embodiments, the impression capping criteria data for a given onboarding content item indicates that a user is not qualified to receive the given onboarding content item (e.g., for a predetermined time period) after a predetermined number of prior user impressions of the given onboarding content item and no further user interaction with the given onboarding content item (e.g., after the onboarding content item has been shown to the user a predetermined number of times without any measurable response from the user). The frequency setting data may specify that the user is qualified to receive the given onboarding content item periodically (e.g., every Tuesday, every other week, etc.). In some embodiments, the product onboarding system 200 may display a user interface enabling an operator of the product onboarding system 200 to specify the aforementioned impression capping criteria data and/or frequency setting data. In operation 703, the identification module 202 determines, for each onboarding content item in the set, based on the user behavior log data and/or user profile data accessed in operation 701, and based on the impression capping criteria data and/or frequency setting data accessed in operation 702, whether the particular member is qualified to receive the corresponding onboarding content item. It is contemplated that the operations of method 700 may incorporate any of the other features disclosed herein. Various operations in the method 700 may be omitted or rearranged, as necessary.

In some embodiments, the product onboarding system 200 may store content inclusion data associated with each displayed snack. For example, for each snack displayed in each email, the product onboarding system 200 may track the specific snack, the variant of that snack (if applicable), the user that received the snack, the type of email that included the snack, the date & time this snack was displayed, and so on.

Moreover, the product onboarding system 200 may store impression tracking data associated with each displayed snack. For example, for each snack displayed in each email, the product onboarding system 200 may detect and track if the snack was actually viewed by the user. For example, aggregated data from Hotmail® may be utilized for this purpose. Moreover, the product onboarding system 200 may store click tracking data associated with each displayed snack. For example, in addition to impressions, the product onboarding system 200 may track clicks (if any) for that particular snack in order to determine how a given user is responding to a given snack. Moreover, the product onboarding system 200 may store downstream actions data associated with each displayed snack. For example, each snack is usually geared towards getting the user to take an action (e.g. connect/update profile, upload address book), so the product onboarding system 200 may track the downstream actions that happen when users clicks on a snack (e.g., in the aggregate). As described in more detail below, the aforementioned impression tracking data and click tracking data may be utilized as input into a user propensity model that dynamically predicts the user's likelihood to click on various snacks.

In some embodiments, the dynamic selection described in operation 505 in FIG. 5 comprises selecting the specific onboarding content item from the set of candidate onboarding content items, based on a random selection scheme. In some embodiments, the dynamic selection described in operation 505 in FIG. 5 comprises selecting the specific onboarding content item from the set of candidate onboarding content items, based on a weighted rotation selection scheme, wherein onboarding content items are chosen randomly from the set with a probability that is determined by a weight that is assigned to each onboarding content item in the set, and wherein a most recently viewed candidate onboarding content item in the set is assigned a tower weight relative to other candidate onboarding content items in the set.

In some embodiments, the dynamic selection described in operation 505 in FIG. 5 comprises selecting a specific onboarding content item from a set of candidate onboarding content items, based on a weighted rotation selection scheme, wherein onboarding content items are chosen randomly from the set with a probability that is determined by a business rule weight that is assigned to each onboarding content item in the set. For example, if the recipient has <30 connections, he gets PYMK/Pending Invite snacks 80% of the time.

In some embodiments, the dynamic selection described in operation 505 in FIG. 5 comprises generating, for the particular member and the email type, a relevance score for each of the candidate onboarding content items in the remaining set, each of the relevance scores indicating a likelihood that the particular member selects the corresponding candidate onboarding content item. The 204 may then select, based on the generated relevance scores, the specific onboarding content item from the set of candidate onboarding content items (e.g., if the specific onboarding content item has the highest relevance score). In some embodiments, the generating of the relevance scores comprises performing prediction modeling, based on the feature data described herein and a trained prediction model, to predict the likelihood of the particular member selecting the corresponding candidate onboarding content item. The prediction model may be any one of a logistic regression model, a Naïve Bayes model, a support vector machines (SVM) model, a decision trees model, and a neural network model. In some embodiments, the prediction model may be trained based on stored impression tracking data and click tracking data for each user, in order to dynamically predicts the user's likelihood to click on various snacks. For example, based on each user's impression tracking data and click tracking data (described above), the system 200 may learn that, for example, a particular user tends to click on a first type of snack but not on a second type of snack, and so the relevance score generated for the first type of snack may be higher than the relevance score generated for the second type of snack. Aspects of the prediction module that may be performed by the selection module 204 are described in greater detail below.

Figure 8:
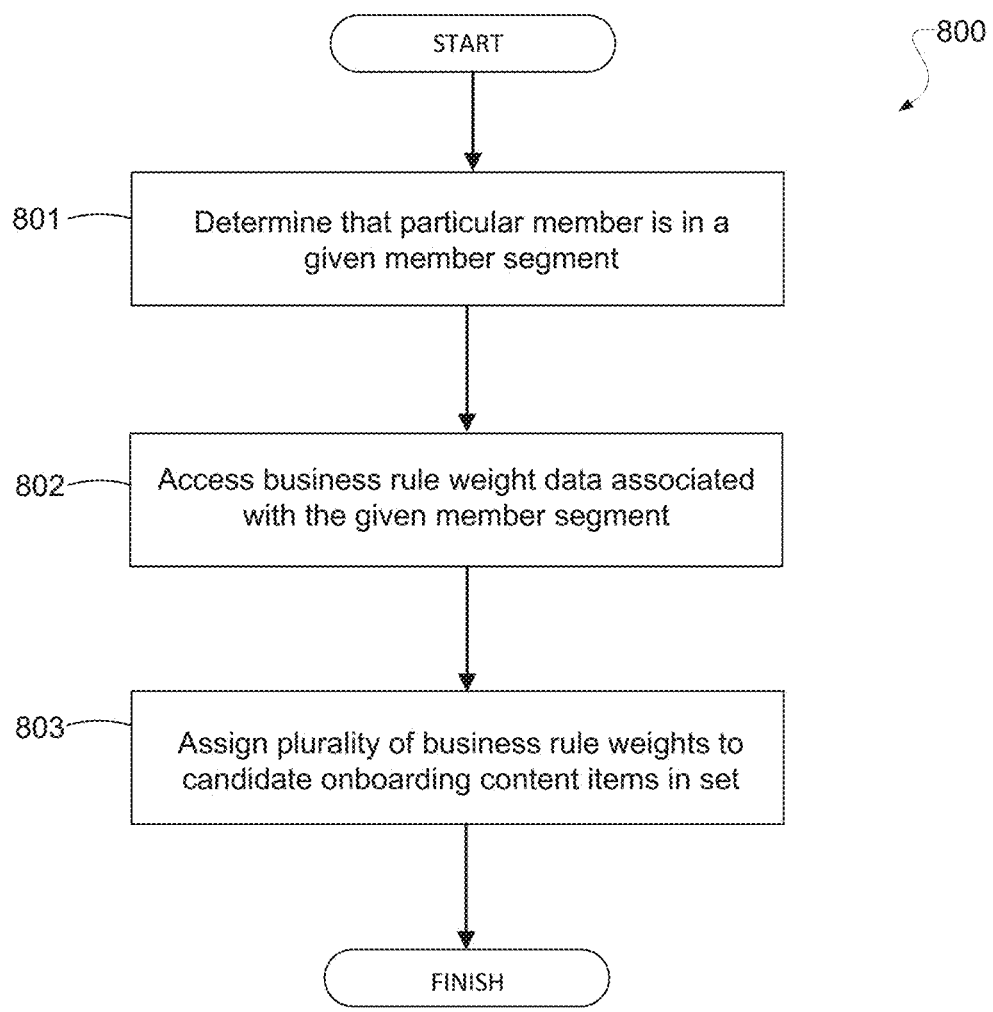
FIG. 8 is a flowchart illustrating an example method, according to various embodiments.

FIG. 8 is a flowchart illustrating an example method 800 for assigning business rule weights to candidate onboarding content items in a set, consistent with various embodiments described herein. The method 800 may be performed at least in part by, for example, the product onboarding system 200 illustrated in FIG. 2 (or an apparatus having similar modules, such as one or more client machines or application servers). In operation 801, the selection module 204 determines that a particular member is in a given member segment (or has certain member profile attributes), based on member profile data of the particular member. In operation 802, the selection module 204 accesses business rule weight data associated with the given member segment (or member profile attributes). The business rule weight data may identify a business rule weight to be assigned to each candidate onboarding content item in a set for the purposes of selecting of onboarding content items for a member in the given member segment. For example, if the recipient has <30 connections, the business rule weight data may specify that the PYMK and Pending Invites snacks receive higher weights so that they will be selected 80% of the time. In some embodiments, the product onboarding system 200 may display a user interface enabling an operator of the product onboarding system 200 to specify the aforementioned business rule weight data. In operation 803, the selection module 204 assigns, based on the business rule weight data, the plurality of business rule weights to the candidate onboarding content items in the set in operation 802. It is contemplated that the operations of method 800 may incorporate any of the other features disclosed herein. Various operations in the method 800 may be omitted or rearranged, as necessary.

Various embodiments described herein refer to predicted clicks of onboarding content items themselves. For example, in various embodiments described above, the selection module 204 generates relevance scores indicating a likelihood that a member selects on an onboarding content item in an email. However, according to various example embodiments, the selection module 204 may generate relevance scores indicating a likelihood that the particular member selects on some other content item (e.g., the body of the email), rather than selecting the onboarding content item itself. For example, the LinkedIn® online social networking service includes a "schools and company in common" onboarding content item that may be displayed, in conjunction with an "invitation to connect" email, where this onboarding content item indicates schools and companies that the email recipient has in common with another member (e.g., the other member sending the invitation to connect to the email recipient). In some embodiments, this onboarding content item does not itself include anything to click or interact with, and it is simply there to inform and educate the member, and possibly to entice them to accept the invitation from the other member by clicking on the body of the email. Thus, in this example, the selection module 204 may generate a relevance score indicating a likelihood that a member selects on the body of the email including such a "schools and company in common" onboarding content item. Accordingly, an onboarding content item may not always be clickable, but may entice the recipient to click on other parts of the email, or it may be there for the purposes of product placement or to inform members about various products or features.

According to various example embodiments, the system 200 may also dynamically select the location of a given onboarding content items in a given e-mail to a given user. For example, the selection module 204 may generate relevance scores indicating the likelihood that a given user will click on a given onboarding content item in a given e-mail in each of various positions in the email (e.g., below other content items, above other content items, to the side of other content items, or in between other content items (e.g., such that the other content items and the onboarding content items are displayed in a content feed format)). The selection module 204 may then identify the particular location associated with the highest relevance score as the appropriate location for placement of the given onboarding content item. The selection module 204 may generate the relevant scores using a trained prediction model, consistent with various embodiments described herein. For example, the prediction model may be trained based on historical impression tracking data and/or click tracking data associated with each user, where such data indicates how the user has interacted with snacks in various locations within an e-mail. For example, if the impression tracking data and/or click tracking data indicates that the user tends to click on snacks when they are located in a first location within an e-mail and not when they are located within a second location within an e-mail, then the relevance score generated for the snack in the first location will be higher than the relevant score generated for the snack in a second location.

As described above, information about each user's location, geography, or locale may be stored (e.g., in database 28 in FIG. 1). This information may be utilized to modify the set of candidate onboarding content items for a given user (e.g., if there are different available onboarding content items different for different local, state, international regions, etc.). Moreover, this information may also be utilized to modify when snacks are transmitted to a particular user based on the time zone of the user. The system 200 may infer the member's time zone if the member doesn't explicitly set it (e.g., based on the member's current location, or the location of the member's current employer or current school as listed in their member profile data).

Example Prediction Models

As described above, the selection module 204 may use any one of various known prediction modeling techniques to perform the prediction modeling. For example, according to various exemplary embodiments, the selection module 204 may apply a statistics-based machine learning model such as a logistic regression model to the based on the email content data, member email interaction data, member site interaction data, and member profile data associated with one or more members of an online social network. As understood by those skilled in the art, logistic regression is an example of a statistics-based machine learning technique that uses a logistic function. The logistic function is based on a variable, referred to as a log it. The log it is defined in terms of a set of regression coefficients of corresponding independent predictor variables. Logistic regression can be used to predict the probability of occurrence of an event given a set of independent/predictor variables. A highly simplified example machine learning model using logistic regression may be ln $[p/(1-p)]=a+BX+e$, or $[p/(1-p)]=\exp(a+BX+e)$, where ln is the natural logarithm, $\log_{exp}$, where exp= 2.71828 . . . , p is the probability that the event Y occurs, $p(Y=1)$, $p/(1-p)$ is the "odds ratio", ln $[p/(1-p)]$ is the log odds ratio, or "log it", a is the coefficient on the constant term, B is the regression coefficient(s) on the independent/predictor variable(s), X is the independent/predictor variable(s), and e is the error term. In some embodiments, the independent/predictor variables of the logistic regression model may correspond to email content data, member email interaction data, member site interaction data, and member profile data associated with one or more members of an online social network (where the aforementioned data may be encoded into numerical values and inserted into feature vectors). The regression coefficients may be estimated using maximum likelihood or learned through a supervised learning technique from the data, as described in more detail below. Accordingly, once the appropriate regression coefficients (e.g., B) are determined, the features included in a feature vector (e.g., email content data, member email interaction data, member site interaction data, and member profile data associated with one or more members of an online social network) may be plugged in to the logistic regression model in order to predict the probability (or "confidence score") that the event Y occurs (where the event Y may be, for example, a particular member clicking on particular snack). In other words, provided a feature vector including email content data, member email interaction data, member site interaction data, and member profile data associated with one or more members of an online social network, the feature vector may be applied to a logistic regression model to determine the probability that a particular member may click on particular snack. Logistic regression is well understood by those skilled in the art, and will not be described in further detail herein, in order to avoid occluding various aspects of this disclosure. The 204 may use various other prediction modeling techniques understood by those skilled in the art to generate the aforementioned confidence score. For example, other prediction modeling techniques may include other computer-based machine learning models such as a gradient-boosted machine (GBM) model, a Naïve Bayes model, a support vector machines (SVM) model, a decision trees model, and a neural network model, all of which are understood by those skilled in the art.

According to various embodiments described above, the feature data may be used for the purposes of both offline training (for generating, training, and refining a prediction model and or the coefficients of a prediction model) and online inferences (for generating confidence scores). For example, if the selection module 204 is utilizing a logistic regression model (as described above), then the regression coefficients of the logistic regression model may be learned through a supervised learning technique from the feature data. Accordingly, in one embodiment, the identity inference system 200 may operate in an offline training mode by assembling the feature data into feature vectors. The feature vectors may then be passed to the selection module 204, in order to refine regression coefficients for the logistic regression model. For example, statistical learning based on the Alternating Direction Method of Multipliers technique may be utilized for this task. Thereafter, once the regression coefficients are determined, the system 200 may operate to perform online (or offline) inferences based on the trained model (including the trained model coefficients) on a feature vector representing email content data, member email interaction data, member site interaction data, and member profile data associated with one or more members of an online social network. According to various exemplary embodiments, the offline process of training the prediction model based on email content data, member email interaction data, member site interaction data, and member profile data associated with one or more members of an online social network may be performed periodically at regular time intervals (e.g., once a day), or may be performed at irregular time intervals, random time intervals, continuously, etc. Thus, since the email content data, member email interaction data, member site interaction data, and member profile data associated with one or more members of an online social network may change over time, it is understood that the prediction model itself may change over time (based on the current data used to train the model).

Example Mobile Device

Figure 9:
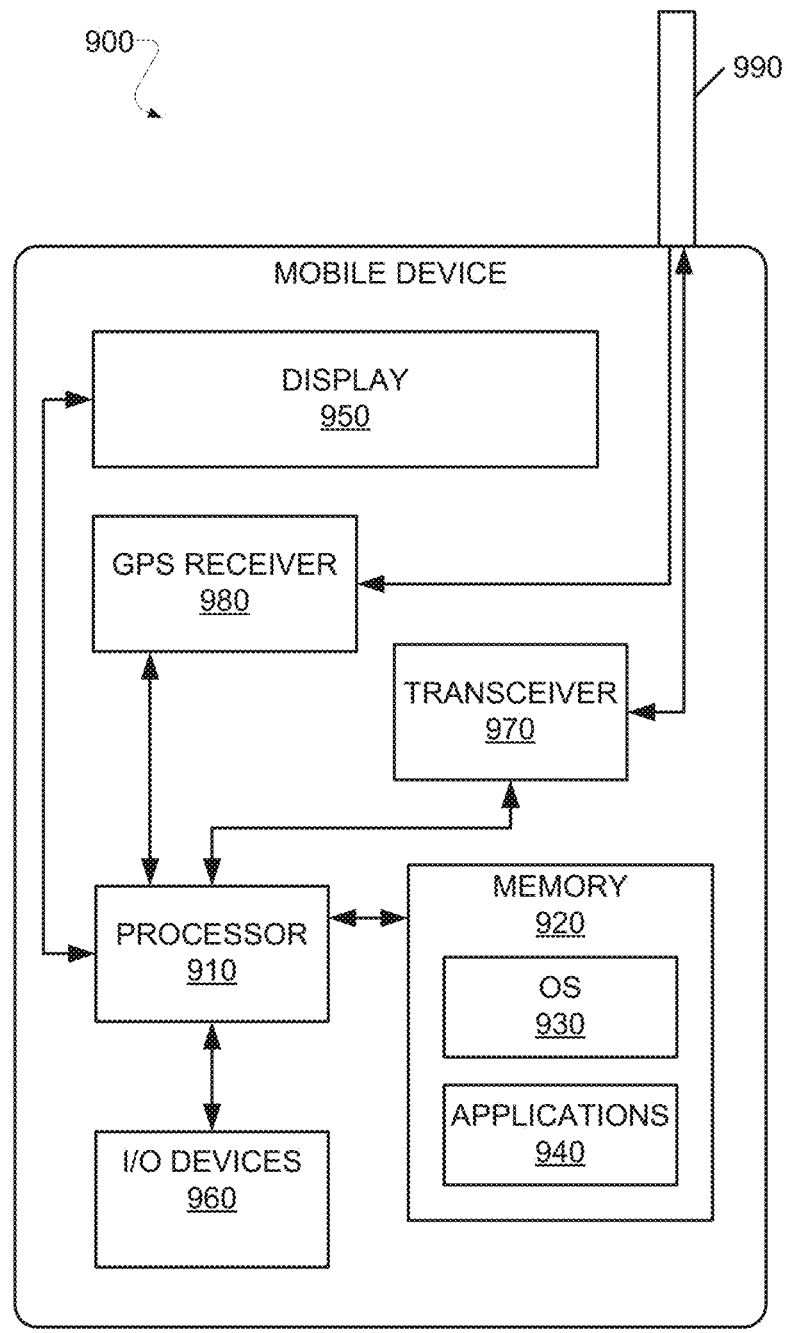
FIG. 9 illustrates an example mobile device, according to various embodiments.

FIG. 9 is a block diagram illustrating the mobile device 900, according to an example embodiment. The mobile device may correspond to, for example, one or more client machines or application servers. One or more of the modules of the system 200 illustrated in FIG. 2 may be implemented on or executed by the mobile device 900. The mobile device 900 may include a processor 910. The processor 910 may be any of a variety of different types of commercially available processors suitable for mobile devices (for example, an XScale architecture microprocessor, a Microprocessor without Interlocked Pipeline Stages (MIPS) architecture processor, or another type of processor). A memory 920, such as a Random Access Memory (RAM), a Flash memory, or other type of memory, is typically accessible to the processor 910. The memory 920 may be adapted to store an operating system (OS) 930, as well as application programs 940, such as a mobile location enabled application that may provide location based services to a user. The processor 910 may be coupled, either directly or via appropriate intermediary hardware, to a display 950 and to one or more input/output (I/O) devices 960, such as a keypad, a touch panel sensor, a microphone, and the like. Similarly, in some embodiments, the processor 910 may be coupled to a transceiver 970 that interfaces with an antenna 990. The transceiver 970 may be configured to both transmit and receive cellular network signals, wireless data signals, or other types of signals via the antenna 990, depending on the nature of the mobile device 900. Further, in some configurations, a GPS receiver 980 may also make use of the antenna 990 to receive GPS signals.

Modules, Components and Logic

Certain embodiments are described herein as including logic or a number of components, modules, or mechanisms.

Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communication with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 10:
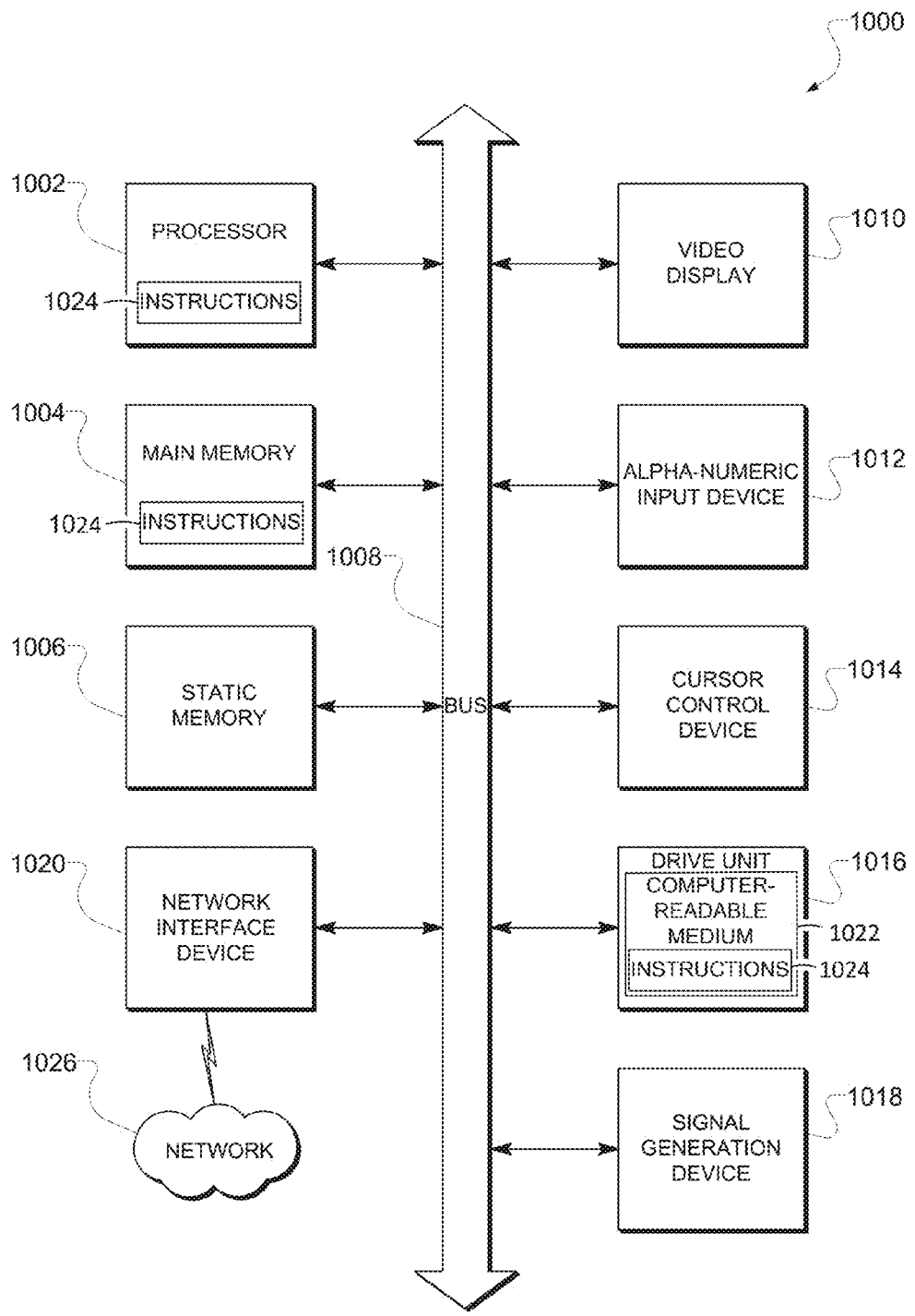
FIG. 10 is a diagrammatic representation of a machine in the example form of a computer system within which a set of instructions, for causing the machine to perform any one or more of the methodologies discussed herein, may be executed.

FIG. 10 is a block diagram of machine in the example form of a computer system 1000 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard or a touch-sensitive display screen), a user interface (UI) navigation device 1014 (e.g., a mouse), a disk drive unit 1016, a signal generation device 1018 (e.g., a speaker) and a network interface device 1020.

Machine-Readable Medium

The disk drive unit 1016 includes a machine-readable medium 1022 on which is stored one or more sets of instructions and data structures (e.g., software) 1024 embodying or utilized by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi, LTE, and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
    accessing, via one or more data sources, email content data describing an email type of an email to be transmitted to a particular member of an online social network service;

accessing, via the one or more data sources, candidate information identifying a set of candidate onboarding content items associated with the email type, each of the onboarding content items in the set being configured to promote a product feature associated with the online social network service;

removing, from the set, a first subset of the candidate onboarding content items, responsive to determining that the particular member has already been onboarded to products associated with the candidate onboarding content items in the first subset;

removing, from the set, a second subset of the candidate onboarding content items, responsive to determining that the particular member has previously viewed and not further interacted with the candidate onboarding content items in the second subset after being exposed to the candidate onboarding content in accordance with an impression capping rule that is tuned to the particular member; and dynamically selecting, using one or more processors, a specific onboarding content item from the set of candidate onboarding content items for inclusion in a portion of the email along with content displayed in an additional portion of the email.

2. The method of claim 1, further comprising:
inserting the specific onboarding content item in the email to be transmitted to the particular member; and
transmitting the email to the particular member.

3. The method of claim 1, wherein the candidate information identifies a plurality of email types and one or more candidate onboarding content items associated with each of the email types.

4. The method of claim 1, wherein the determining that the particular member has already been onboarded to products associated with the candidate onboarding content items in the first subset further comprises:
accessing user behavior log data associated with the particular member;
accessing user qualifying criteria data associated with each onboarding content item in the set, the user qualifying criteria data for a given onboarding content item indicating that a user is not qualified to receive the given onboarding content item based on prior user interaction with a product associated with the given onboarding content item, the prior user interaction corresponding to performing a predetermined user action in connection with the product during a predetermined time period; and
determining, for each onboarding content item in the set, based on the user behavior log data and the user qualifying criteria data, whether the particular member is qualified to receive the corresponding onboarding content item.

5. The method of claim 1, wherein the determining that the particular member has previously viewed and not further interacted with the candidate onboarding content items in the second subset further comprises:
accessing user behavior log data associated with the particular member;
accessing impression capping criteria data associated with each onboarding content item in the set, the impression capping criteria data for a given onboarding content item indicating that a user is not qualified to receive the given onboarding content item for a predetermined time period after a predetermined number of prior user impressions of the given onboarding content item and no further user interaction with the given onboarding content item; and
determining, for each onboarding content item in the set, based on the user behavior log data and the impression capping criteria data, whether the particular member is qualified to receive the corresponding onboarding content item.

6. The method of claim 1, wherein the dynamically selecting further comprises:
selecting the specific onboarding content item from the set of candidate onboarding content items, based on a random selection scheme.

7. The method of claim 1, wherein the dynamically selecting further comprises:
selecting the specific onboarding content item from the set of candidate onboarding content items based on a weighted rotation selection scheme, wherein onboarding content items are chosen randomly from the set with a probability that is determined by a weight that is assigned to each onboarding content item in the set, and wherein a most recently viewed candidate onboarding content item in the set is assigned a lower weight relative to other candidate onboarding content items in the set.

8. The method of claim 1, wherein the dynamically selecting further comprises:
selecting the specific onboarding content item from the set of candidate onboarding content items based on a weighted rotation selection scheme, wherein onboarding content items are chosen randomly from the set with a probability that is determined by a business rule weight that is assigned to each onboarding content item in the set.

9. The method of claim 8, wherein the dynamically selecting further comprises:
determining that the particular member is in a given member segment, based on member profile data of the particular member;
accessing business rule weight data associated with the given member segment, the business rule weight data identifying a business rule weight to be assigned to each candidate onboarding content item in the set in conjunction with selection of onboarding content items for a member in the given member segment; and
assigning, based on the business rule weight data, a plurality of business rule weights to the candidate onboarding content items in the set.

10. A system comprising:
a processor; and
a memory device holding an instruction set executable on the processor to cause the computer system to perform operations comprising:
accessing, via one or more data sources, email content data describing an email type of an email to be transmitted to a particular member of an online social network service;
accessing, via the one or more data sources, candidate information identifying a set of candidate onboarding content items associated with the email type, each of the onboarding content items in the set being configured to promote a product feature associated with the online social network service;
removing, from the set, a first subset of the candidate onboarding content items, responsive to determining that the particular member has already been onboarded to products associated with the candidate onboarding content items in the first subset;

removing, from the set, a second subset of the candidate onboarding content items, responsive to determining that the particular member has previously viewed and not further interacted with the candidate onboarding content items in the second subset after being exposed to the candidate onboarding content in accordance with an impression capping rule that is tuned to the particular member; and dynamically selecting, using one or more processors, a specific onboarding content item from the set of candidate onboarding content items for inclusion in a portion of the email along with content displayed in an additional portion of the email.

11. The system of claim 10, wherein the operations further comprise:

inserting the specific onboarding content item in the email to be transmitted to the particular member; and transmitting the email to the particular member.

12. The system of claim 10, wherein the candidate information identifies a plurality of email types and one or more candidate onboarding content items associated with each of the email types.

13. The system of claim 10, wherein the determining that the particular member has already been onboarded to products associated with the candidate onboarding content items in the first subset further comprises:

accessing user behavior log data associated with the particular member;

accessing user qualifying criteria data associated with each onboarding content item in the set, the user qualifying criteria data for a given onboarding content item indicating that a user is not qualified to receive the given onboarding content item based on prior user interaction with a product associated with the given onboarding content item, the prior user interaction corresponding to performing a predetermined user action in connection with the product during a predetermined time period; and determining, for each onboarding content item in the set, based on the user behavior log data and the user qualifying criteria data, whether the particular member is qualified to receive the corresponding onboarding content item.

14. The system of claim 10, wherein the determining that the particular member has previously viewed and not further interacted with the candidate onboarding content items in the second subset further comprises:

accessing user behavior log data associated with the particular member;

accessing impression capping criteria data associated with each onboarding content item in the set, the impression capping criteria data for a given onboarding content item indicating that a user is not qualified to receive the given onboarding content item for a predetermined time period after a predetermined number of prior user impressions of the given onboarding content item and no further user interaction with the given onboarding content item; and determining, for each onboarding content item in the set, based on the user behavior log data and the impression capping criteria data, whether the particular member is qualified to receive the corresponding onboarding content item.

15. The system of claim 10, wherein the dynamically selecting further comprises:

selecting the specific onboarding content item from the set of candidate onboarding content items, based on a random selection scheme.

16. The system of claim 10, wherein the dynamically selecting further comprises:

selecting the specific onboarding content item from the set of candidate onboarding content items based on a weighted rotation selection scheme, wherein onboarding content items are chosen randomly from the set with a probability that is determined by a weight that is assigned to each onboarding content item in the set, and wherein a most recently viewed candidate onboarding content item in the set is assigned a lower weight relative to other candidate onboarding content items in the set.

17. The system of claim 10, wherein the dynamically selecting further comprises:

selecting the specific onboarding content item from the set of candidate onboarding content items based on a weighted rotation selection scheme, wherein onboarding content items are chosen randomly from the set with a probability that is determined by a business rule weight that is assigned to each onboarding content item in the set.

18. The system of claim 17, wherein the dynamically selecting further comprises:

determining that the particular member is in a given member segment, based on member profile data of the particular member;

accessing business rule weight data associated with the given member segment, the business rule weight data identifying a business rule weight to be assigned to each candidate onboarding content item in the set in conjunction with selection of onboarding content items for a member in the given member segment; and assigning, based on the business rule weight data, a plurality of business rule weights to the candidate onboarding content items in the set.

19. A non-transitory machine-readable storage medium comprising instructions that, when executed by one or more processors of a machine, cause the machine to perform operations comprising:

accessing, via one or more data sources, email content data describing an email type of an email to be transmitted to a particular member of an online social network service;

accessing, via the one or more data sources, candidate information identifying a set of candidate onboarding content items associated with the email type, each of the onboarding content items in the set being configured to promote a product feature associated with the online social network service;

removing, from the set, a first subset of the candidate onboarding content items, responsive to determining that the particular member has already been onboarded to products associated with the candidate onboarding content items in the first subset;

removing, from the set, a second subset of the candidate onboarding content items, responsive to determining that the particular member has previously viewed and not further interacted with the candidate onboarding content items in the second subset after being exposed to the candidate onboarding content in accordance with an impression capping rule that is tuned to the particular member; and dynamically selecting a specific onboarding content item from the set of candidate onboarding content items for inclusion in a portion of the email along with content displayed in an additional portion of the email.

20. The storage medium of claim 19, wherein the operations further comprise:
   inserting the specific onboarding content item in the email to be transmitted to the particular member; and
   transmitting the email to the particular member.

* * * * *